Dec. 18, 1951  J. A. VAUGHAN  2,579,132
SPRAYING APPARATUS
Filed Nov. 12, 1948  2 SHEETS—SHEET 1
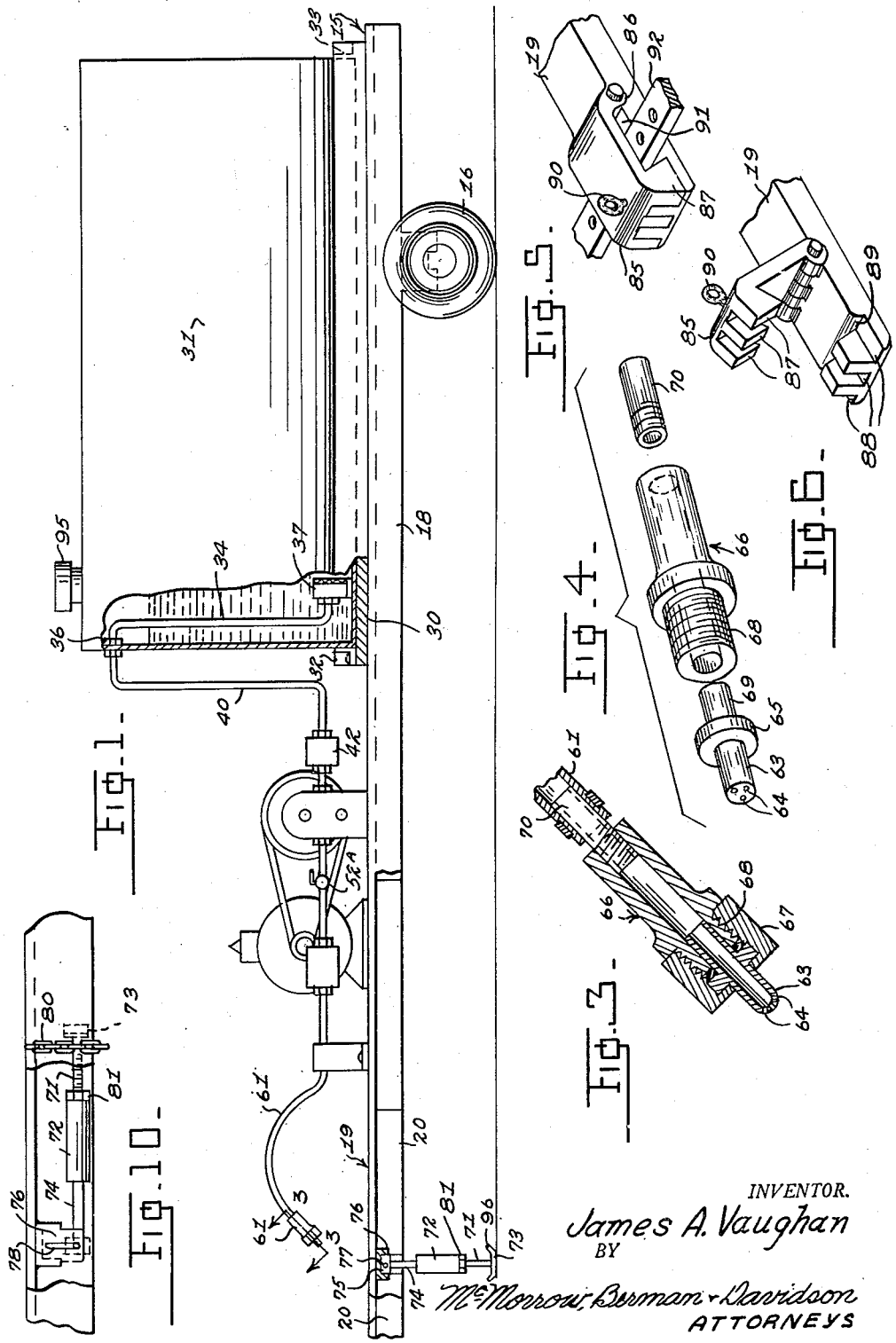
INVENTOR.
James A. Vaughan
BY
McMorrow, Berman & Davidson
ATTORNEYS Dec. 18, 1951  J. A. VAUGHAN  2,579,132
SPRAYING APPARATUS
Filed Nov. 12, 1948  2 SHEETS—SHEET 2
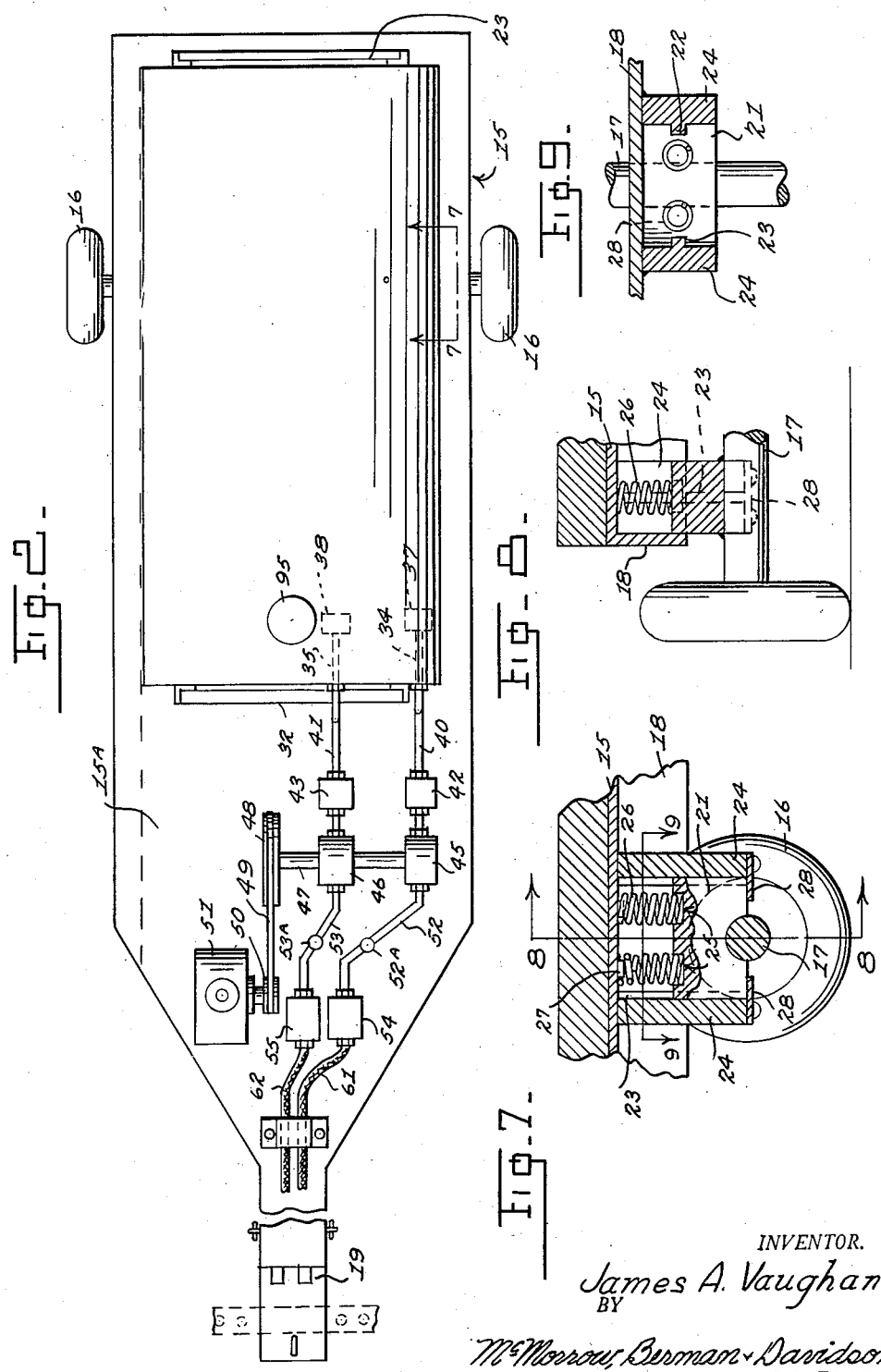
INVENTOR.
James A. Vaughan
BY
McMorrow, Berman & Davidson
ATTORNEYS Patented Dec. 18, 1951

2,579,132

UNITED STATES PATENT OFFICE 2,579,132

SPRAYING APPARATUS

James A. Vaughan, Marshalltown, Iowa

Application November 12, 1948, Serial No. 59,576

2 Claims. (Cl. 299—45)

This invention relates to a spraying apparatus adapted to be attached to a tractor.

An object of the invention is the provision of an apparatus adapted particularly for spraying water onto ears of corn while in the husks to assist mechanical corn pickers in thoroughly removing the saturated husks from the ears, the apparatus including a body having a water tank thereon of sufficient capacity to maintain spraying operations for approximately five hours with a pumping means on the body for withdrawing water from the tank and forcing said water through a pair of nozzles for spraying the corn on the stalks in advance of a picking and husking machine.

A further object of the invention is the provision of an apparatus including a wheeled carriage for coordinating a plurality of instrumentalities into a compact unit for spraying corn on the stalks in a field for wetting the husks of the corn in advance of the picking and husking operations so that the husking rollers of a mechanical picker will remove the husks more readily, the wheeled carriage being provided with a tongue and a special form of hitch for attaching the carriage to a tractor and with a specially constructed jack for supporting the tongue in a horizontal position when said tongue has been disconnected from the tractor.

The invention is best understood from a consideration of the following detailed description in connection with the accompanying drawings. Nevertheless, it is to be borne in mind that the invention is not confined to the disclosure but is susceptible of such changes and modifications as shall define no material departure from the salient features of the invention as expressed in the appended claims.

In the drawings—

Figure 1 is a side view of my spraying apparatus adapted to be attached to a tractor;

Figure 2 is a plan view of the spraying apparatus;

Figure 3 is an enlarged vertical section of a nozzle taken along the line 3—3 of Figure 1;

Figure 4 is an enlarged view in perspective of the nozzle and the connecting attachments shown in separated relation;

Figure 5 is a fragmentary perspective view of the draft hitch;

Figure 6 is a fragmentary perspective view illustrating one section of the hitch in open position;

Figure 7 is an enlarged vertical section of the bearings for the axle of the carriage for the apparatus and a spring suspension therefor taken along the line 7—7 of Figure 2;

Figure 8 is a transverse vertical section taken along the line 8—8 of Figure 7;

Figure 9 is a horizontal section taken along the line 9—9 of Figure 7;

Figure 10 is an enlarged fragmentary side view of the tongue for the spraying apparatus showing a supporting jack located in an inoperative position.

Referring more particularly to the drawings, 15 designates a body of the spraying apparatus which is supported by a pair of wheels 16 and an axle 17. The body is reinforced by depending flanges 18 and is reduced at the front end to form a tongue 19 which is also reinforced by flanges 20. The last mentioned flanges in connection with the reduced portion form in effect a channel member. The portion of the body indicated by the numeral 15a constitutes a platform for supporting various operating mechanisms of the spraying machine.

The axle 17 is mounted in a bearing block 21 which has vertically disposed grooves 22 for the reception of ribs 23 on parallel guide bars 24 secured to the underface of the body 15 and to the flanges 18. The upper face of each bearing block has a pair of sockets 25 for seating the lower ends of coil springs 26. Lugs 27 depending from the underface of the body receive the upper ends of the springs which act as a cushioning means between the body and the axle. Metal strips 28 secured to the lower edges of the bars 24 limit downward movement of the bearing 21.

A base 30 is secured to the body 15 upon which rests a tank 31 for water. This tank is held in place at the front and rear ends by respective angle irons 32 and 33. Suction pipes 34 and 35 are connected between the unions 36 at the upper inner face of the front wall of said tank and respective inlet strainers 37 and 38. A pipe 40 is in communication with the pipe 34 and extends downwardly from the front wall of the tank and is connected to a discharge strainer 42. A pipe 41 located in parallel relation with the pipe 40 is connected between the pipe 35 and a discharge strainer 43.

A pair of centrifugal pumps 45 and 46 are mounted on the platform 15a and are driven by a shaft 47 revolved by a pulley 48 which in turn is rotated by a belt 49, and a pulley 50 driven by the shaft of an internal combustion engine 51 also mounted on the platform. Respective pipes 52 and 53 connect the pumps 45 and 46 with alined choke fittings 54 and 55. Valves 52a and 53a are respectively incorporated in the pipes 52 and 53.

A nozzle 60 is connected with the choke fitting 54 by a flexible hose 61. A flexible hose 62 places a second nozzle (not shown) in communication with the choke fitting 55. Each nozzle, as shown in Figures 3 and 4, has a flanged nipple 63 provided with a suitable number of perforations 64. The flange 65 of the nipple is screwed tight upon the outer end of a hollow connection 66 by a cap nut 67 engaging threads 68 after the inner end 69 of the nipple is received by said connection. A tube 70 has one end threaded into the inner end of the connection while the other has the flexible hose 61 clamped thereon.

A jack (Figures 1 and 10) consists of a leg 71 which has the upper end threaded into a barrel 72 for adjusting said leg to maintain the tongue 19 in a horizontal position and the lower end threaded into a reversible foot 73. A rod 74 rigid with the upper end of the barrel has a square-shaped enlargement 75 received within a square-shaped socket 76 for maintaining the jack in a vertical position. A pin 77 received by slots 78 in the pair of the opposite side walls of the socket and rigid with the enlargement permits swinging of the leg to a horizontal position when the tongue 19 is raised so that the pin will drop to the bottom of the slots while the head or enlargement 75 drops out of the socket. A chain 80 may be employed for retaining the jack in an inoperative position (Figure 10). A nut 81 screwed up tight against the lower end of the barrel 72 maintains the leg 71 in its adjusted position.

The end of the tonuge may be provided with any of the well-known forms of hitches for connecting the tongue to a tractor. However, I have designed a specially constructed hitch which includes a leaf 85 pivoted at 86 on the tongue 19 and the leaf is divided into a pair of claws 87 received neatly within slots 88 with the free ends of the claws snapping over the curved inner ends 89 of the slots formed in the outer free end of the tongue. An eye bolt 90 is fixed to the leaf and said bolt may be attached to a rod extending to the tractor for raising the jaws out of the slots 88.

It will be noted that the foot plate 73 on the leg 71 of the jack has lugs 96 at the opposite ends thereof. The plate may be removed by unscrewing the same from the lower threaded end of the leg. The plate is reversed in position so that the lugs 96 will engage the ground to prevent slippage. On the other, the smooth surface of the plate is employed on concrete or other like surfaces.

The tank 31 is filled with approximately 300 gallons of water after the filler cap 95 has been removed. At this time, the hitch on the end of the tongue 19 may be attached to the member 92 on a tractor or the tongue may be supported in a horizontal position by the jack when located in a vertical position and when the tongue has been detached from the tractor.

The tractor draws the apparatus between rows of the corn stalks and both nozzles are in operation for spraying two rows of the stalks. It is to be borne in mind, that where it is unnecessary to employ both nozzles, one may be cut out by a clutch for releasing one of the pumps from the shaft 47. The choke fittings 54 and 55 together with the strainers control the flow of the water through the nozzles. However, the valves 52a and 53a are included in the respective pipes 52 and 53 for controlling the flow of water through the nozzles and for cutting out one of the nozzles when desired.

What I claim:

1. In a spraying device, a wheeled support, a tank adapted to contain a spray liquid and arranged upon and fixedly supported on said support, a first upstanding pipe positioned within said tank adjacent to and spaced from one end thereof and having the upper end projecting through and supported in said one end of said tank, the lower end of said pipe being spaced from the bottom of said tank, a vertically disposed strainer fixedly positioned within said tank adjacent said one end thereof and connected to the lower end of said first pipe, a second upstanding pipe positioned exteriorly of said tank adjacent to and spaced from said one end of said tank and having the upper end connected to the projecting upper end of said first pipe, the lower end of said second pipe being spaced above said support, a second vertically disposed strainer positioned adjacent the lower end of said second pipe and connected to the latter, a pump on said support and having its suction end connected to said second strainer, and a sprayer operatively connected to the discharge end of said pump.

2. In a spraying device, a wheeled support, a tank adapted to contain a spray liquid arranged upon and fixedly supported on said support, a first upstanding pipe positioned within said tank adjacent to and spaced from one end thereof and having the upper end projecting through and supported in said one end of said tank, the lower end of said pipe being spaced from the bottom of said tank, a vertically disposed strainer fixedly positioned within said tank adjacent said one end thereof and connected to the lower end of said first pipe, a second upstanding pipe positioned exteriorly of said tank adjacent to and spaced from said one end of said tank and having the upper end connected to the projecting upper end of said first pipe, the lower end of said second pipe being spaced above said support, a second vertically disposed strainer positioned adjacent the lower end of said second pipe and connected to the latter, a pump on said support and having its suction end connected to said second strainer, a conduit having one end connected to the discharge end of said pump, a sprayer connected to the other end of said conduit, and means interposed in said conduit intermediate the ends thereof for controlling the rate of flow of liquid to said sprayer.

JAMES A. VAUGHAN.

REFERENCES CITED

The following references are of record in the file of this patent:

UNITED STATES PATENTS

| Number | Name | Date |
|--------|------|------|
| 880,240 | Overhiser | Feb. 25, 1908 |
| 1,571,837 | Hull | Feb. 2, 1926 |
| 1,579,319 | Hull | Apr. 6, 1926 |
| 2,048,063 | Friedman | July 21, 1936 |
| 2,254,751 | Paradise | Sept. 2, 1941 |
| 2,293,334 | Ernst | Aug. 18, 1942 |
| 2,366,969 | Kiggins | Jan. 9, 1945 |